(12) United States Patent
Song

(10) Patent No.: US 8,776,057 B2
(45) Date of Patent: Jul. 8, 2014

(54) SYSTEM AND METHOD FOR PROVIDING EVIDENCE OF THE PHYSICAL PRESENCE OF VIRTUAL MACHINES

(75) Inventor: Zhexuan Song, Sunnyvale, CA (US)

(73) Assignee: Fujitsu Limited, Kawasaki-shi (JP)

(*) Notice: Subject to any disclaimer, the term of this patent is extended or adjusted under 35 U.S.C. 154(b) by 218 days.

(21) Appl. No.: 13/151,757

(22) Filed: Jun. 2, 2011

(65) Prior Publication Data

US 2012/0311574 A1   Dec. 6, 2012

(51) Int. Cl.
*G06F 9/46* (2006.01)
*G06F 15/173* (2006.01)
*G06F 9/455* (2006.01)

(52) U.S. Cl.
USPC ............ 718/1; 718/100; 718/102; 718/104; 709/223; 709/224; 709/226

(58) Field of Classification Search
None
See application file for complete search history.

(56) References Cited

U.S. PATENT DOCUMENTS

| | | | |
|---|---|---|---|
| 2005/0198303 A1* | 9/2005 | Knauerhase et al. | 709/227 |
| 2008/0098392 A1* | 4/2008 | Wipfel et al. | 718/1 |
| 2008/0222375 A1* | 9/2008 | Kotsovinos et al. | 711/162 |
| 2010/0031258 A1* | 2/2010 | Takano et al. | 718/1 |
| 2011/0066597 A1* | 3/2011 | Mashtizadeh et al. | 707/640 |
| 2011/0078681 A1* | 3/2011 | Li et al. | 718/1 |
| 2011/0131576 A1* | 6/2011 | Ikegaya et al. | 718/1 |
| 2011/0145380 A1* | 6/2011 | Glikson et al. | 709/223 |
| 2011/0196968 A1* | 8/2011 | Kobayashi et al. | 709/226 |
| 2011/0205904 A1* | 8/2011 | Nakagawa | 370/241 |
| 2011/0246669 A1* | 10/2011 | Kanada et al. | 709/238 |
| 2011/0296410 A1* | 12/2011 | Lo et al. | 718/1 |
| 2012/0030346 A1* | 2/2012 | Fukuda et al. | 709/224 |
| 2012/0084445 A1* | 4/2012 | Brock et al. | 709/226 |
| 2012/0151477 A1* | 6/2012 | Sinha et al. | 718/1 |

OTHER PUBLICATIONS

Wikipedia; "Public-key cryptography"; www.wikipedia.org; pp. 11, Jun. 1, 2011.
Wikipedia; "Cloud computing"; www.wikipedia.org; pp. 19, Jun. 1, 2011.
Wikipedia; "Trusted Platform Module"; www.wikipedia.org; pp. 5, Jun. 1, 2011.
Wikipedia; "Hardware virtualization"; www.wikipedia.org; pp. 6, Jun. 1, 2011.
Wikipedia; "Digital signature"; www.wikipedia.org; pp. 9, Jun. 1, 2011.
Wikipedia; "Virtual machine"; www.wikipedia.org; pp. 8, Jun. 1, 2011.
Wikipedia; "Hypervisor"; www.wikipedia.org; pp. 7, Jun. 1, 2011.

* cited by examiner

*Primary Examiner* — Charles Swift
(74) *Attorney, Agent, or Firm* — Baker Botts L.L.P.

(57) ABSTRACT

In accordance with some embodiments of the present disclosure a method for providing evidence of a physical location of a virtual machine comprises launching, by an information technology (IT) resource, a virtual machine from a virtual machine image. The method further comprises generating, by the IT resource, a chain entry in a physical presence chain of the virtual machine image, the chain entry including an identifier of the IT resource indicating that the IT resource launched the virtual machine.

22 Claims, 7 Drawing Sheets

SYSTEM AND METHOD FOR PROVIDING EVIDENCE OF THE PHYSICAL PRESENCE OF VIRTUAL MACHINES

TECHNICAL FIELD

The present disclosure relates in general to networking, and more particularly, to systems and methods for providing evidence of the physical presence of virtual machines associated with cloud computing.

BACKGROUND

Cloud computing is being used more and more by entities (e.g., individuals, companies, governments etc.) to perform the computing and data storage needs of these entities. Cloud computing may refer to a model for enabling convenient, on-demand network access to a shared pool of configurable computing resources (e.g., networks, servers, storage, applications and services). Accordingly, by using cloud computing, entities may have access to a network of information technology (IT) resources without having to manage the actual resources. This network of IT resources used in cloud computing may be referred to generally as "a cloud." The IT resources that make up the cloud may be geographically distributed throughout the world such that one or more services (e.g., computing, storage, etc.) provided to a user in one part of the world may be performed by an IT resource in a different part of the world. Additionally, one or more services being performed by an IT resource located in a certain location on behalf of a user may be directed to be performed by another IT resource located in a different location than the other IT resource.

The allocation and transferring of services between IT resources may be transparent to a user of the cloud. Therefore the user may be unaware of the physical location of the IT resources. However, some cloud computing users (e.g., the United States Government) may require that cloud computing services performed on behalf of the user are performed by IT resources located within a particular geographic area (e.g., within the United States and its territories).

SUMMARY

In accordance with some embodiments of the present disclosure a method for providing evidence of a physical location of a virtual machine comprises launching, by an information technology (IT) resource, a virtual machine from a virtual machine image. The method further comprises generating, by the IT resource, a chain entry in a physical presence chain of the virtual machine image, the chain entry including an identifier of the IT resource indicating that the IT resource launched the virtual machine.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Figure 1:
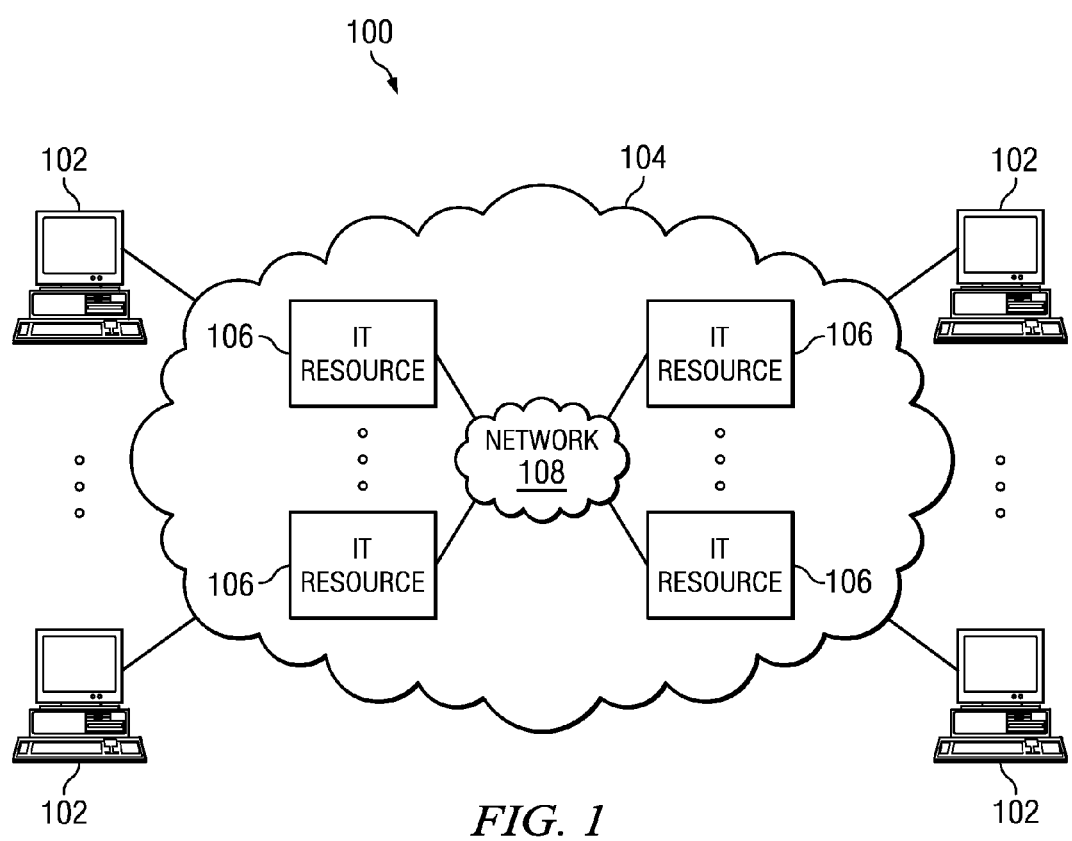
FIG. 1 illustrates an example embodiment of a computing system that uses cloud computing, according to some embodiments of the present disclosure.

FIG. 1 illustrates an example embodiment of a computing system 100 that uses cloud computing. As discussed in further detail below, system 100 may include a cloud 104 configured to provide computing services to one or more users at one or more terminals 102 communicatively coupled to cloud 104. Cloud 104 may include a plurality of information technology (IT) resources 106 configured to provide one or more computing services to terminals 102. As described further below, cloud 104 may be configured to create one or more virtual machines to provide one or more computing services to terminals 102. Cloud 104 may be configured to track which IT resource 106 may be running a virtual machine such that evidence of the physical presence of the virtual machines may be obtained. Additionally, cloud 104 may be configured to enforce any geographical limitations that may be placed on the location of an IT resource running a virtual machine, such that the physical presence of the virtual machine may be enforced.

A terminal 102 may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a terminal 102 may be a personal computer, a PDA, a consumer electronic device, a network storage device, a smart phone, a server or any other suitable device and may vary in size, shape, performance, functionality, and price.

A terminal 102 may include a processor and memory. A processor may comprise any suitable system, apparatus or device configured to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In the present embodiments, a processor may interpret and/or execute program instructions and/or process data stored in memory communicatively coupled to the processor.

Memory may comprise any system, device or apparatus configured to retain program instructions or data for a period of time (e.g., computer-readable media). Memory may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its respective controller is turned off.

Additional components of a terminal 102 may include one or more storage devices comprising memory and configured to store data, one or more communications ports for communicating with external devices as well as various input and output (I/O) devices, such as a keyboard, a mouse, and a video display. A terminal 102 may also include one or more buses configured to transmit communications between the various hardware components.

Terminals 102 may be communicatively coupled to cloud 104 via any suitable network and/or network connection. In certain embodiments, the network may be a communication network. A communication network allows nodes to communicate with other nodes. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the proceeding.

Cloud 104 may comprise a network of IT resources 106 configured to provide a user of terminal 102 a convenient, on-demand network access to a shared pool of configurable computing resources (e.g., networks, servers, storage, applications and services). In the present example, cloud 104 may comprise a plurality of IT resources 106 configured to provide one or more computing services to one or more terminals 102.

For example, instead of a user storing files and information locally on a terminal 102, the user may access cloud 104 via terminal 102 and may direct cloud 104 to store the files and/or information. One or more IT resources 106 included in cloud 104 may accordingly store the information. The user may access the information or files stored on the IT resources 106 by accessing cloud 104 via terminal 102 (e.g., via a web browser of terminal 102). Accordingly, a user may access and store data and information using terminal 102 without the data and information being stored locally on terminal 102.

As another example, a terminal 102 may access cloud 104 via a web browser and request to run a program (e.g. a word processing program, an operating system, etc.). An IT resource 106 may consequently run the requested program and may present a page of the running program to the terminal 102 via the web browser. As a user of terminal 102 inputs commands and/or information on the page depicting the program (via the terminal 102 and web browser), the terminal 102 may communicate the commands to cloud 104 via the web browser. The IT resource 106 running the program may respond according to the commands and/or information received such that the program running on the IT resource 106 may perform the commands as instructed by the user at the terminal 102. Therefore, terminal 102 may access and use the program running on the IT resource 106 through the web browser and cloud 104 as if the program were locally installed on terminal 102. Accordingly, terminal 102 may use and access the operating system and/or other programs without having the operating system and/or programs stored on terminal 102. As described in further detail with respect to FIG. 2, the operating system and/or other programs may be run by a virtual machine executed by an IT resource 106.

Similarly to terminals 102, IT resources 106 may comprise any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. Additionally, Similar to a terminal 102, an IT resource 106 may include a processor and memory configured to perform the operations of the IT resource 106. Additional components of an IT resource 106 may include one or more storage devices comprising memory and configured to store data, one or more communications ports for communicating with external devices. An IT resource 106 may also include one or more buses configured to transmit communications between the various hardware components. In the present embodiment, an IT resource 106 may comprise a network storage device, a server or any other suitable device.

IT resources 106 of cloud 104 may be communicatively coupled to each other via network 108. Network 108 may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the proceeding. Accordingly, IT resources 106 of cloud 104 may be found in different geographic locations throughout the world.

The computing services performed with respect to a terminal 102 (e.g., a virtual machine) may be allocated and distributed between IT resources 106 according to the processing demands of services performed with respect to a terminal 102 and according to the capabilities of IT resources 106. As mentioned above, the performance of computing services for terminal 102 may be transferred from one IT resource 106 to another in a transparent manner such that a user at terminal 102 may not know which IT resource 106 is performing certain services. Additionally, the IT resources 106 may be distributed in different locations throughout the world, such that computing services performed for a user may be performed anywhere.

However, some users of cloud computing services (e.g., the United States government) may require that the computing services be performed within certain geographic areas (e.g., within the borders of the United States and its territories). Accordingly, as described in further detail with respect to FIGS. 3a-3c, a cloud network (e.g., cloud 104) may be configured to track which IT resources (e.g., IT resources 106) are performing computing services such that the physical presence of computing services being performed with respect to a user terminal (e.g., a terminal 102) may be verified. Additionally, a cloud network (e.g., cloud 104) may be configured such that computing services are performed by the IT resources that comply with the geographic limitation requirements of a user terminal.

Modifications, additions or omissions may be made to system 100 without departing from the scope of the present disclosure. For example, system 100 is depicted with a certain number of terminals 102 and IT resources 106, but the present disclosure should not be limited to such. Additionally, terminals 102 may be coupled to other networks not associated with cloud 104.

Figure 2:
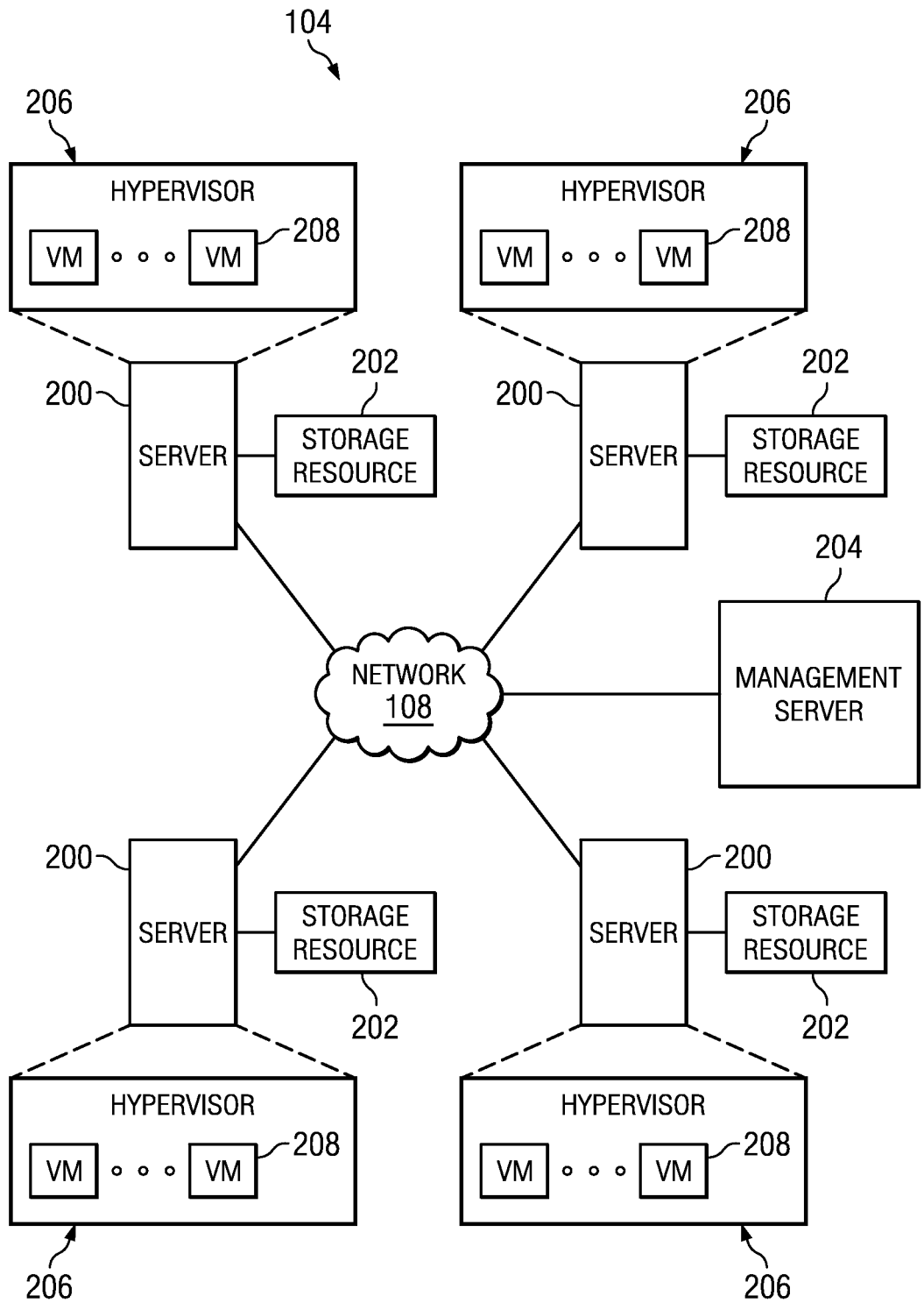
FIG. 2 illustrates an example embodiment of a cloud network according to some embodiments of the present disclosure.

FIG. 2 illustrates an example embodiment of cloud 104 according to some embodiments of the present disclosure. As mentioned previously, cloud 104 may comprise a plurality of IT resources 106 configured to provide one or more computing services to terminals 102. In the present example, IT resources 106 of cloud 104 may comprise a plurality of servers 200, storage resources 202, and a management server 204. Servers 200, storage resources 202 and management server 204 of cloud 104 may be coupled together via network 108 as described above.

Servers 200 may comprise any suitable IT resource (e.g., an IT resource 106 of FIG. 1) configured to perform computing services that may be presented to a user terminal (e.g., a terminal 102 of FIG. 1) via cloud 104. For example, a server 200 may be configured to run a program (e.g., operating system, word processor, etc.) for a user terminal and may present a display of the output (e.g., page updates) of the program to the terminal via cloud 104 as described above in FIG. 1.

Servers 200 may be configured to run one or more virtual machines (VM) 208 to improve the efficiency of servers 200. A VM 208 may comprise a software implementation of a machine (e.g., a computer) that may execute programs like a physical machine. In some instances a VM 208 may comprise a system virtual machine that may support the execution of a complete operating system and as such may support the execution of a plurality of processes and programs. In other instances, a VM 208 may comprise a process virtual machine that may be configured to run a single program or a small number of programs such that it may support a single process or small number of processes.

By running VM's 208, a server 200 may be able to allocate underlying physical machine resources of the server 200 between each of the VM's 208 being run by the server 200. Additionally, by running VM's 208, a server 200 may be able to run multiple operating system environments in isolation from each other. Accordingly, by using VM's 208 a server 200 may be able to run an operating system and/or program for one user terminal and may be able to run a different operating system and/or program for another user terminal in an isolated setting such that the different VM's 208 and processes performed for different users may not interfere with each other.

Each server 200 running VM's 208 may also include a hypervisor 206. Hypervisor 206 may comprise a software layer configured to provide the virtualization of VM's 208. Hypervisor 206 may present to VM's 208 a virtual operating platform (e.g., virtual hardware) and may monitor the execution of VM's 208. In some instances hypervisor 206 may run directly on the hardware of server 200 such that hypervisor 206 may serve as a direct interface between the hardware of server 200 and VM's 208. In other instances, hypervisor 206 may be run by an operating system of server 200 and hypervisor 206 may serve as an interface between VM's 208 and the operating system and the operating system may serve as an interface between hypervisor 206 and the hardware of server 200.

Cloud 104 may also include a storage resource 202 communicatively coupled to and associated with each server 200. In the present example, each server 200 may be directly coupled to a different storage resource 202. In other embodiments, a server 200 may be coupled to a storage resource 202 via network 108 and one or more servers 200 may share one or more storage resources 202.

Storage resources 202 may comprise any suitable storage medium such as, for example, a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory. Storage resources 202 may be configured to store an image file of a VM 208 known as a VM image, described in greater detail below. Accordingly, a VM 208 may comprise a running instance of a VM image.

Management server 204 of cloud 104 may comprise any suitable system, apparatus or device configured to allocate and provision the use of IT resources (e.g., servers 200, storage resources 202, etc.) within cloud 104. In some instances management server 204 may comprise a Domain Name System (DNS) server.

Management server 204 may be configured to access information associated with each server 200. The information associated with each server 200 may include a unique identifier that may identify an individual server 200. The information associated with each server 200 may also include a physical location of each server 200 linked to the unique identifier of each server 200. Accordingly, if the unique identifier of a server 200 is known, the information may be referred to such that the physical location of the associated server 200 may be known. The information associated with servers 200 may also include, but is not limited to, performance and computing capabilities of each server 200, computing demands of each server 200, etc. The information associated with servers 200 may be formatted as a look up table with entries associated with each unique identifier of each server 200. The server information may be stored locally on management server 204 or on a storage resource communicatively coupled to management server 204 either via network 108 or any other suitable connection. Additionally, each server 200 may locally store its associated server information such that each server 200 may monitor and/or know information with respect to itself, such as physical location information.

Management server 204 may determine which IT resources of cloud 104 may perform which computing services for user terminals (e.g., terminals 102 of FIG. 1). Management server 204 may determine which IT resources may perform which computing services based on factors derived from the information associated with servers 200. For example, management server 204 may allocate computing services to IT resources, based on, but not limited to, the location of the user terminal with respect to a server 200, the percentage of capacity at which a server 200 may be operating, the computing capabilities of a server 200, the software that a server 200 may be configured to run, or any combination thereof.

For example, a user terminal may access cloud 104 (e.g., via a web browser and the Internet) and may request the use of a computing service. Management server 204 may be configured to receive the request and may determine which server 200 may perform the computing service based on the available computing capabilities of the server 200. Upon determining which server 200 may perform the computing service, management server 204 may direct that server 200, via network 108, to perform the computing service. In some instances the server 200 may accordingly launch a VM 208 to perform the desired computing service and may send page updates to the user terminal as described above.

Additionally, management server 204 may determine that a computing service being performed by one server 200 should be performed by another server 200 and may direct that the computing service be moved accordingly. Management server 204 may reallocate computing services between servers 200 based on factors similar to those used to determine which server 200 may originally be assigned to perform the computing services (e.g., percentage of capacity of a server being used, etc.).

Figure 3A:
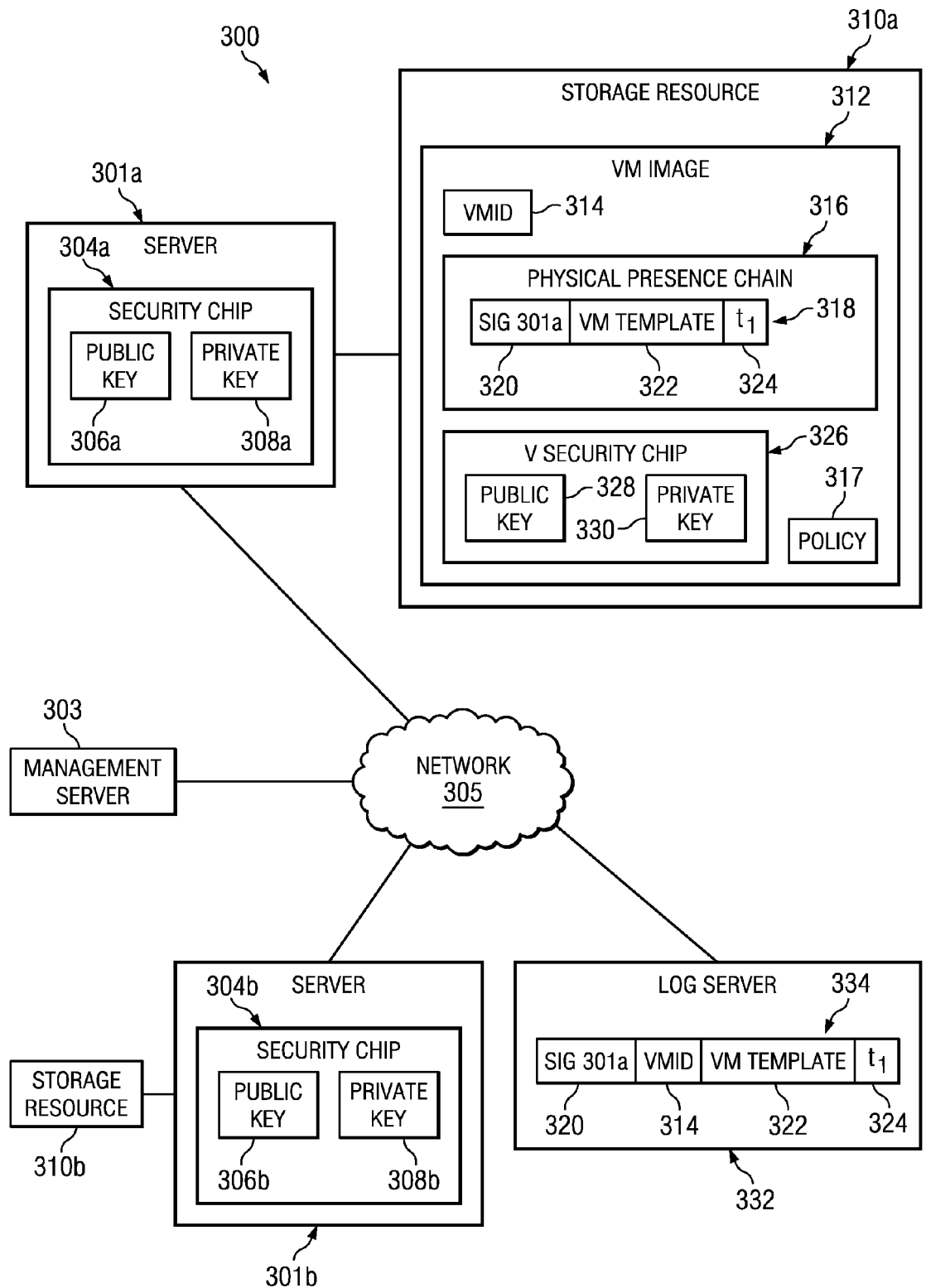
FIGS. 3a-3c illustrate an example embodiment of a cloud network configured to track which servers may run a virtual machine such that the physical location of the virtual machine may be verified and/or enforced.
Figure 3B:
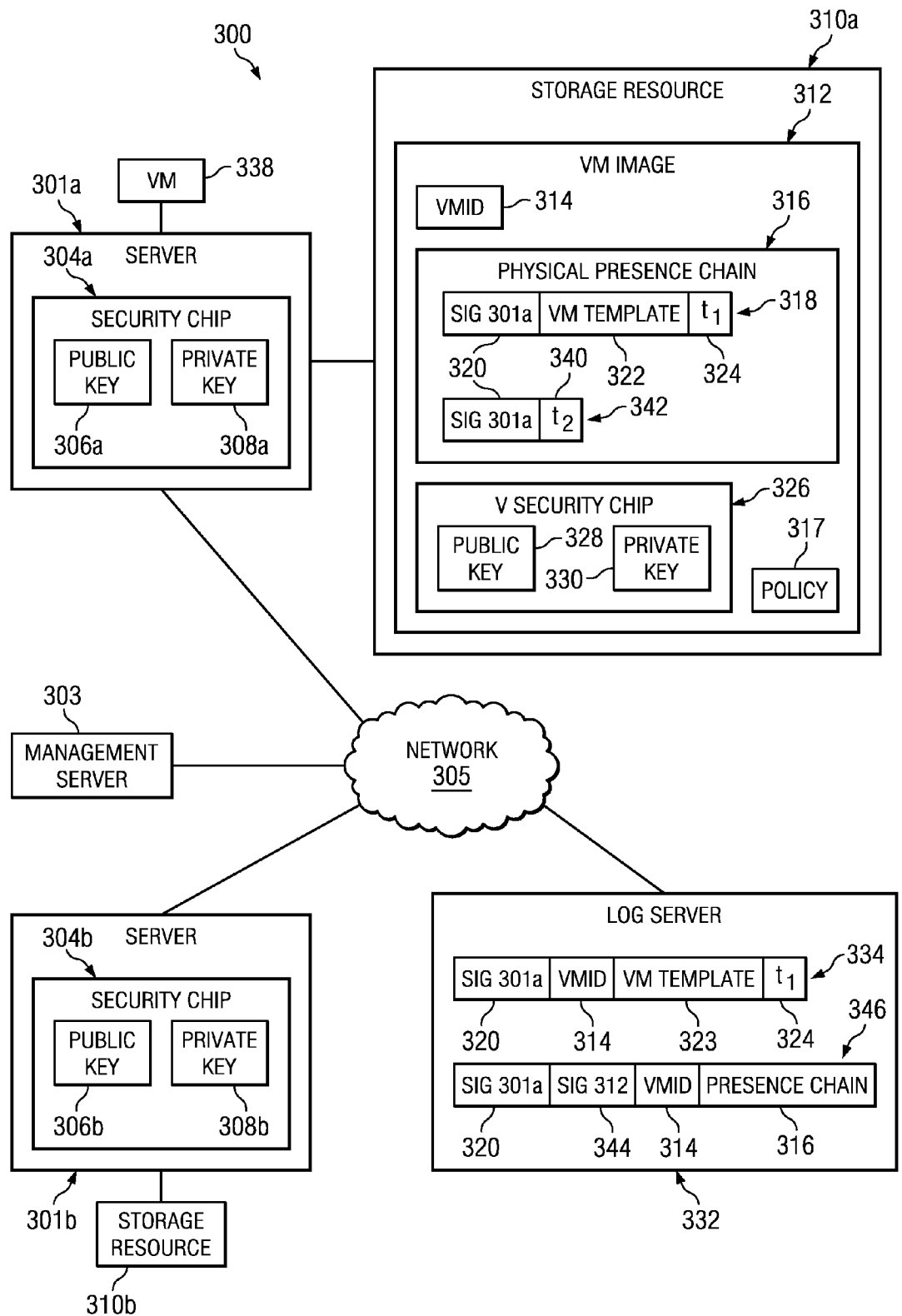
Figure 3C:
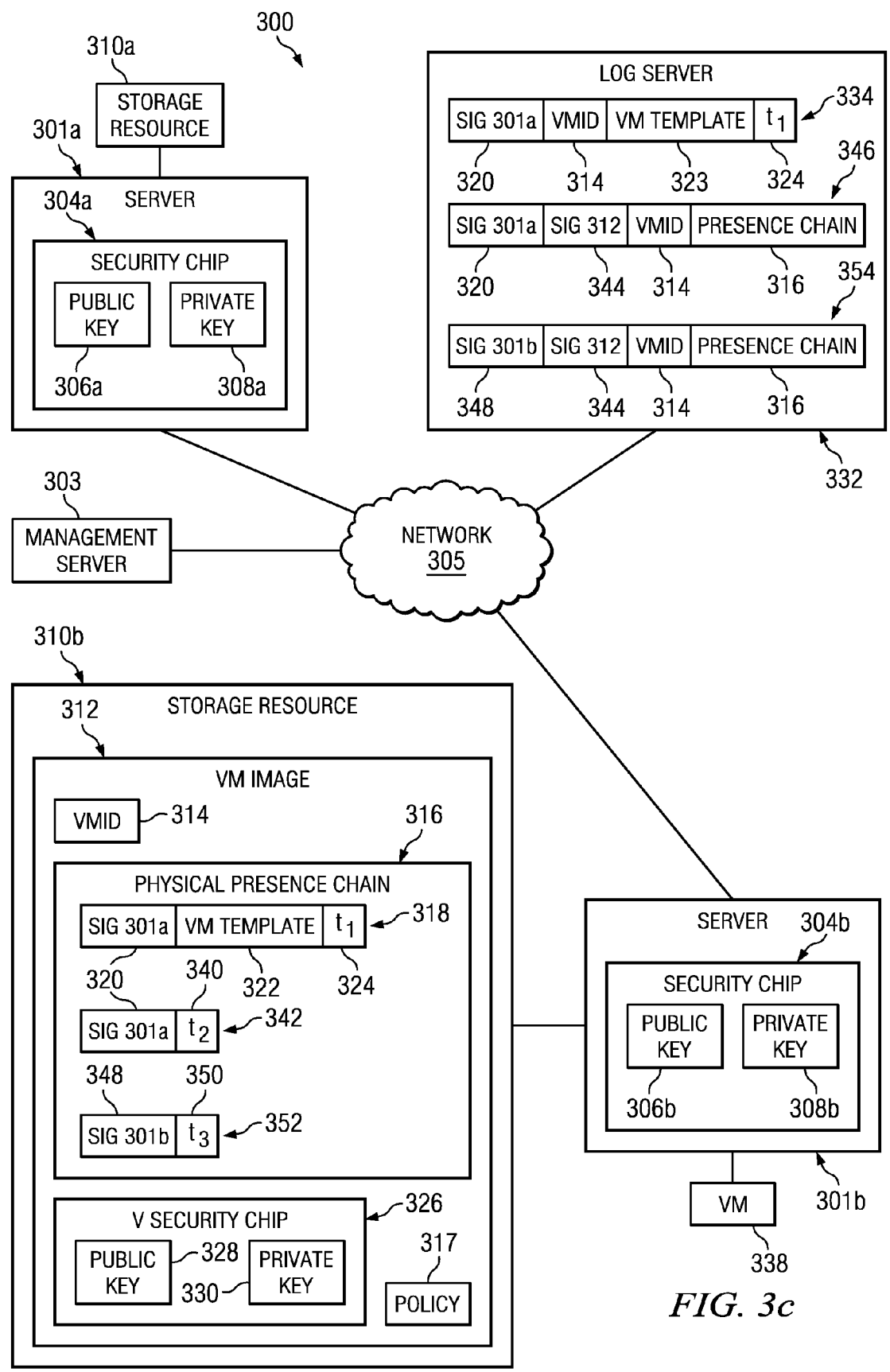

In some instances, the moving of a computing service from one server 200 to another may comprise changing a VM 208 from being run by one server 200 to being run by another server 200. In accordance with the description of FIGS. 3a-3c, cloud 104 may be configured to track which servers 200 run which VM's 208 such that the location of computing services being performed may be determined and verified. Additionally, in accordance with the description of FIGS. 3a-3c, cloud 104 may be configured such that if a server 200 is outside of the geographic limitations associated with a user terminal that server 200 may not be allowed to perform computing services for the user terminal. FIGS. 3a-3c further describe the allocation and movement of virtual machines (e.g., VM's 208) from one server (e.g., a server 200) to another server. Additionally, FIGS. 3a-3c further describe the tracking of which servers may be performing computing services and the enforcement of geographic restrictions.

Modifications, additions or omissions may be made to FIG. 2 without departing from the scope of the present disclosure. For example, cloud 104 may include more or fewer servers 200, storage resources 202 and/or management servers 204 than those depicted. Additionally, cloud 104 may include other IT resources configured to perform other operations than those specifically described herein.

FIGS. 3a-3c illustrate an example embodiment of a cloud 300 configured to track which servers may run a virtual machine (e.g., a VM 208 of FIG. 2) such that the physical location of the virtual machine may be verified and/or enforced. Cloud 300 may comprise a cloud network similar to cloud 104 of FIGS. 1 and 2. Cloud 300 may include servers 301a and 301b, substantially similar to servers 200 of FIG. 2 and configured to run a virtual machine based on a virtual machine image (VM image) 312. As described in further detail below, VM image 312 may store information related to which server 301 is running and/or has run the virtual machine associated with virtual machine image 312. Accordingly, VM image 312 may track which server 301 has run the associated virtual machine. By knowing which server 301 has run the virtual machine, the physical presence of the virtual machine may be verified by verifying the physical location of the server 301. Further, as described below, the VM image 312 may be configured to store a policy (e.g., a geographic restriction policy) and a server 301 may or may not launch the virtual machine associated with VM image 312 based on whether the server 301 does or does not comply with the policy.

Servers 301a and 301b may include security chips 304a and 304b respectively. Security chips 304 may comprise any suitable system, apparatus, or device that may be used to authenticate servers 301. In some instances, a security chip 304 may comprise a trusted platform module (TPM) chip as defined by a TPM specification produced by the trusted computing group. Security chips 304 may be configured such that a server 301 may produce a digital signature that may be used to authenticate that the server 301 is the source of information transmitted. In the present embodiment, and as described in further detail below, a server 301 may be configured to "sign" VM image 312 with its associated digital signature upon creating VM image 312 and/or running the virtual machine associated with VM image 312 to identify the server 301 that has performed operations with respect to VM image 312.

Servers 301 may create a digital signature based on a digital signature scheme. To implement the digital signature scheme, servers 301 may implement an asymmetric key algorithm which may comprise a method where information needed to encrypt information may be different from the information needed to decrypt the information. As such, in the present embodiment, security chip 304a may be configured to generate a public key 306a and a private key 308a. Additionally, security chip 304b may be configured to generate a public key 306b and a private key 308b. Accordingly, information encrypted with a private key 308 may be decrypted by using the corresponding public key 306 and vice versa (e.g., a message encrypted using private key 308a may be decrypted using public key 306a). Private keys 308 may be known only by their respective security chips 304, but public keys 306 may be made available for other IT resources (e.g., management server 303) to use to verify the source of communications, as described below.

For example, in the present embodiment, a server (e.g., server 301a) may encrypt information using its associated private key (e.g., private key 308a). A third party IT resource (e.g., server 301b, management server 303, etc.) may use the corresponding public key (e.g., public key 306a) to decrypt the message and thus verify that the message did in fact come from the source (e.g., server 301a) it purports to come from. Accordingly, by using security chips 304 and public keys 306 and private keys 308 generated by security chips 304, the source of information communicated and generated within cloud 300 may be verified. As mentioned above, and explained in further detail below, this verification and authentication may be used to reliably identify which servers 301 have run a virtual machine.

Cloud 300 may also include storage resources 310a and 310b substantially similar to storage resources 202 of FIG. 2 and communicatively coupled to servers 301a and 301b respectively. In the present example, each server 301 may be directly coupled to a different storage resource 310. In other embodiments, a server 301 may be coupled to a storage resource 310 via network 305 and one or more servers 301 may share one or more storage resources 310. Storage resources 310 may be configured to store virtual machine images mentioned above, and described in further detail below. Further, cloud 300 may include a management server 303 substantially similar to management server 204 of FIG. 2.

Further, in some instances, cloud 300 may include a log server 332. Log server 332 may comprise any suitable system, apparatus or device configured to store information related to which servers 301 have run a virtual machine, as described in further detail below.

FIG. 3a illustrates an example of cloud 300 configured to track the generation of a VM image 312 generated at a time t1. At time t1, server 301a may generate a VM image 312 that may be stored in storage resource 310a associated with server 301a. Server 301a may generate VM image 312 in response to a command received from management server 303. In some instances, management server 303 may communicate the command to generate VM image 312 in response to a request from a user terminal (e.g., terminal 102 of FIG. 1) to perform a computing service for the user terminal. In other embodiments, management server 303 may communicate the command to generate VM image 312 in anticipation of a computing service request by a user terminal.

Server 301a may generate VM image 312 by accessing a VM template repository (not expressly shown) of cloud 300. The VM template repository may be stored on any suitable IT resource associated with cloud 300 and communicatively coupled to server 301a (e.g., storage resource 310a or another storage resource coupled to server 301a via network 305). Server 301a may choose a VM template from the VM repository based on the requested computing service (e.g., an operating system VM template for a requested operating system). Upon selecting an appropriate VM template, server 301a may copy a VM image of the VM template, such that VM image 312 may be generated.

Server 301a may also generate a virtual machine identifier (VMID) 314 for VM image 312. VMID 314 may act as a unique identifier of VM image 312. In some embodiments VMID 314 may comprise a universally unique identifier as standardized by the Open Software Foundation (OSF) as part of a Distributed Computing Environment (DCE).

VM image 312 may also include a physical presence chain 316. Physical presence chain 316 may include information that may be used to determine the physical presence of servers (e.g., server 301a) that may associated with the generation of VM image 312. In the present example, upon generating VM image 312 at time t1, server 301a may generate a chain entry 318 of physical presence chain 316. Server 301a may "sign" entry 318 with digital signature 320 indicating that entry 318 was generated by server 301a. In some instances, server 301a may "sign" entry 318 with the unique identifier of server 301a, such that information associated with server 301a (e.g., the physical location) may be located.

Server 301a may generate digital signature 320 using private key 308a as described above such that it may be authenticated that entry 318 was in fact generated by server 301a. The authentication may be done by decrypting signature 320, which may have been encrypted using private key 308a, by using public key 306a. Entry 318 may also include template information 322 that may indicate which VM template may have been used to generate VM image 312. Further, entry 318 may include a time stamp 324 indicating the generation of VM image 312 at time t1.

VM image 312 may also include a virtual security chip (vsecurity chip) 326 that may comprise a software implementation of a security chip such as security chips 304. Vsecurity chip 326 may be used such that the virtual machine associated with VM image 312 may also provide a digital signature with information it communicates to reliably indicate that the virtual machine associated with VM image 312 actually communicated the information. Accordingly, vsecurity chip 326 may generate a public key 328 and a private key 330 similar in function to public keys 306 and private keys 308.

In some instances, VM image 312 may also include policy information 317. In the present embodiment, policy information 317 may include information associated with geographic restrictions associated with which servers 301 may launch a virtual machine from VM image 312. In the same or alternative embodiments, policy information 317 may be associated with a security level for the virtual machine that may be launched from VM image 312 such that a server 301 may launch a virtual machine from VM image 312 if the server 301 is running virtual machines with the same and/or a better security level. Another example of policy information 317 may include allowing a server 301 to launch a virtual machine from VM image 312 if the server 301 has a particular hypervisor and/or version (or higher) of the hypervisor. Yet other examples of policy information 317 may include allowing a server 301 to launch a virtual machine from VM image 312 if the server 301 is a highly trusted server (e.g., a server with a full monitoring feature turned on).

Policy information 317 may be associated with the user and/or user terminal requesting the computing service to be performed by the virtual machine associated with VM image 312. For example, a user may login to cloud 300 as a United States government employee and based on the login, management server 303 may determine that computing services requested by the user are limited to being performed by IT resources physically located in the United States. Additionally, server 301a may be located in the U.S. and accordingly, management server 303 may direct server 301a to generate VM image 312. Further, based on the user logging in as a U.S. government employee and stored policies associated with U.S. government employees, management server 303 may direct server 301a to include policy information 317 indicating that only servers 301 located within the U.S. may launch and run a virtual machine from VM image 312.

In some instances, policy information 317 may be included in information associated with the user's account, such that when the user creates an account with cloud 300 the user indicates various policies (e.g., geographic restrictions, virtual machine security level policies, hypervisor policies, server security policies, etc.) associated with the user account. Accordingly, when the user logs in to cloud 300, management server 303 may determine policy 317 from the user's account and may transmit policy 317 to server 301a such that server 301a may include policy 317 with VM image 312 upon generating VM image 312.

Server 301a may also generate a log entry 334 for time t1 and may communicate log entry 334 to log server 332 such that log server 332 may store log entry 334. Log entry 334 may include information similar to chain entry 318 of physical presence chain 316. In the present example, log entry 334 may include digital signature 320 of server 301a reliably indicating that log entry 334 is derived from server 301a. Log entry 334 may also include VMID 314 indicating that log entry 334 is associated with VM image 312. Additionally, log entry 334, like chain entry 318, may include template information 322 that may indicate from which VM template VM image 312 may have been derived. Further, time stamp 324 may be included in log entry 334 indicating the generation of VM template 312 at time t1. Accordingly, in embodiments that comprise log server 332, log entry 334 of log server 334 and chain entry 318 of physical presence chain 316 included in VM image 312 may both include information indicating and verifying that server 301a generated VM image 312 at time t1. Additionally, log entry 334 and chain entry 318 may be compared to verify that the information contained therein is substantially similar, such that log entry 334 and chain entry 318 may be authenticated.

As mentioned above, information related to the location of server 301a may be included in cloud 300 (e.g., stored on management server 303). Therefore, by verifying that server 301a generated VM image 312 at time t1 with chain entry 318 and/or log entry 334, the physical location of the processing and computing being performed to generate VM image 312 at time t1 may be verified.

FIG. 3b illustrates cloud 300 upon server 301a launching a virtual machine (VM) 338 from VM image 312. At a time t2, server 301a may launch VM 338 from VM image 312. In some embodiments, server 301a may check policy 317 before launching VM 338 to verify that server 301a complies with policy 317. For example, policy 317 may include geographic location restrictions and server 301a may check the server information (not expressly shown) associated with server 301a that indicates the physical location of server 301a. Based on the physical location of server 301a and the geographic location restrictions of policy 317, server 301a may determine whether it complies with policy 317.

In other embodiments, as described above, management server 303 may check policy 317 and server information associated with server 301a (not expressly shown) to determine that server 301a complies with policy 317 before directing server 301a to launch VM 338 from VM image 312. In yet another embodiment, server 301a may launch VM 338 from VM image 312 and VM 338 may initially check whether server 301a complies with policy 317. If server 301a complies with policy 317, VM 338 may continue its operations, if not, VM 338 may stop working. Consequently, server 301a, VM 338 and/or management server 303 may be configured to enforce policy 317 (e.g., geographic restrictions) associated with running VM 338 for a user of cloud 300.

Upon launching VM 338, server 301a may generate a chain entry 342 of physical presence chain 316 indicating that server 301a launched VM 338 at time t2. As such, chain entry 342 may include digital signature 320 of server 301a indicating that chain entry 342 is from server 301a. Additionally, chain entry 342 may include timestamp 340 indicating that server 301a launched VM 338 from VM image 312 at time t2. Server 301a may communicate chain entry 342 to log server 332 via network 305.

In embodiments where cloud 300 includes log server 332, server 301a may also generate log entry 346. Log entry 346 may include digital signature 320 of server 301a, thus reliably indicating that log entry 346 is derived from server 301a. Additionally, digital signature 344 of VM image 312 may be included in log entry 346 to indicate in a reliable manner that log entry 346 is derived from and associated with VM image 312, instead of another possible VM image that may be associated with server 301a. In some embodiments, log entry 346 may additionally include VMID 314 to indicate that log entry 346 is associated with VM image 312 (and thus VM 338). In some embodiments, log entry 346 may also include physical presence chain 316 that may include chain entries 318 and 342. In the same or alternative embodiments, log entry 346 may also or may instead include time stamp 340 indicating the launching of VM 338 at time t2. Therefore, physical presence chain 316 and log server 332 may include entries 342 and 346, respectively that may be used to reliably verify that the physical presence of VM 338 is associated with server 301a, whose physical presence may be verified as described above.

FIG. 3c illustrates cloud 300 upon server 301b launching VM 338 from VM image 312. As described above in FIG. 3b, server 301a may initially launch and run VM 338 from VM image 312 at time t2. However, management server 303 may determine to transfer VM 338 to be run by server 301b instead of server 301a. Management server 303 may move VM 338 for any suitable reason, such as those listed above (e.g., server 301a operating at or near capacity and server 301b having available capacity).

Upon deciding to transfer VM 338 from server 301a to server 301b, management server 303 may direct server 301a to pause VM 338 and store the current state of VM 338 in VM image 312. Server 301a may then communicate VM image 312 to server 301b via network 305. Server 301b may store VM image 312 in storage resource 310b. In some embodiments, server 301a may erase VM image 312 from storage resource 310a upon communicating VM image 312 to server 301b. In alternative embodiments, server 301a may leave VM image 312 stored in storage resource 310a.

At a time t3, server 301b may launch VM 338 from VM image 312 now stored on storage resource 310b. As described above, in some embodiments, server 301b may launch VM 338 upon verifying that server 301b complies with policy 317 of VM image 312. In other embodiments, before directing that server 301a communicate VM image 312 to server 301b, management server 303 may check policy 317 to verify that server 301b complies with policy 317. In yet other embodiments, server 301b may launch VM 338 and VM 338 may verify whether or not server 301b complies with policy 317. If server 301b complies with policy 317, VM 338 may continue performing operations; otherwise, VM 338 may stop operating. Consequently, server 301b, VM 338 and/or management server 303 may be configured to enforce policy 317 (e.g., geographic restrictions, VM security level policies, hypervisor policies, server security policies, etc.) associated with running VM 338 for a user of cloud 300.

Upon launching VM 338 from VM image 312, server 301b may generate a chain entry 352 of physical presence chain 316. Chain entry 352 may include a digital signature 348 of server 301b to reliably indicate and verify that chain entry 352 derived from server 301b. Chain entry 352 may additionally include a timestamp 350 indicating the launching of VM 338 from VM image 312 by server 301b at time t3.

In embodiments where cloud 300 may include log server 332, server 301b may also generate a log entry 354 and may communicate log entry 354 to log server 332 via network 305. Log entry 354 may include digital signature 348 of server 301b and digital signature 344 of VM image 312 to reliably indicate that log entry 354 derived from server 301b and VM image 312. Similarly to log entry 346 described in FIG. 3b, log entry 354 may also include VMID 314 to indicate that log entry 354 is associated with VM image 312. Further, in some embodiments, log entry 354 may include physical presence chain 316 that may include chain entries 318, 342 and 352. In the same or alternative embodiments, log entry 354 may also or may instead include time stamp 350 indicating the launching of VM 338 by server 301b at time t3. In some instances, log entries 334, 346 and 354 and/or physical presence chain 316 may be audited to verify that the physical presence of virtual machine 338 complies with a geographic location restriction of policy 317.

Therefore, one or more IT resources of cloud 300 (e.g., servers 301a and 301b, log server 332, management server 303) may be configured such that the resources running virtual machines may be reliably verified to reasonably verify the physical location of the virtual machines. Additionally, one or more IT resources of cloud 300 may be configured to enforce a policy (e.g., geographic restrictions, VM security level policies, hypervisor policies, server security policies, etc.) associated with running a virtual machine.

Modifications, additions or omissions may be made to FIG. 3 without departing from the scope of the present disclosure. For example, in some embodiments, cloud 300 may not include log server 332 and the verification of servers 301 running virtual machine 338 may be based on physical presence chain 316. In other embodiments, VM image 312 may not include physical presence chain 316 and the verification of servers 301 running virtual machine 338 may be based on the log entries included in log server 332. Additionally, although specific information (e.g., digital signatures 320, 344 and 348, VMID 314, timestamps 324, 340 and 350, etc.) is described as being included in chain and log entries, 318, 342, 352, 334, 346 and 354, it is understood that other information may be included, or some information may be excluded from these entries without departing from the scope of the present disclosure. Additionally, specific IT resources (e.g., servers 301, management server 303, log server 332, storage resources 310) have been described performing specific operations, but any suitable IT resources may perform one or more of the described functions. Also, the number of IT resources is merely for illustrative purposes, and any suitable number of IT resources may perform the operations described herein.

Figure 4:
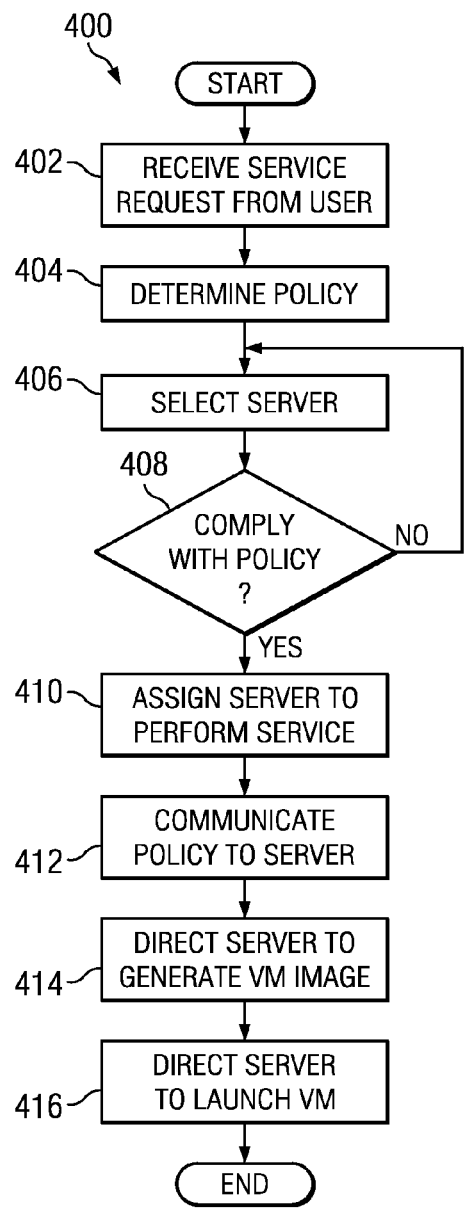
FIG. 4 illustrates an example method for enforcing a policy for a virtual machine upon generation of the virtual machine.

FIG. 4 illustrates an example method 400 for enforcing a policy (e.g., geographic restrictions, VM security level policies, hypervisor policies, server security policies, etc.) for a virtual machine upon generation of the virtual machine. Method 400 may be performed by any suitable, system, apparatus or device configured to perform one or more of the steps of method 400. In the present example method 400 may be performed by a management server of a cloud network (e.g., management server 204 of FIG. 2 or management server 303 of FIGS. 3a-3c); however any other suitable IT resource other than those specifically listed may perform one or more operations described herein.

Method 400 may start and at step 402 a management server of a cloud network may receive, via a network, a request from a user associated with a computing service to be performed for a user. At step 404, the management server may determine a policy associated with the user. For example, the management server may check information in the user's account with the cloud network and may determine that the user's account includes a policy, the user may provide the policy to the management server upon issuing the computing service request, the user may provide the policy to the management server in response to a request by the management server, or by any other suitable method. The policy may comprise a geographic location restriction where computing services performed for the user may only be done in a certain geographic location (e.g., the U.S.). In the same or alternative embodiments, the policy may be associated with a security level for the virtual machine such that a server may launch a virtual machine if the server is running virtual machines with the same and/or better security level. The policy may also include allowing a server to launch a virtual machine if the server has a particular hypervisor and/or version (or higher) of a hypervisor. Yet other examples of the policy may include allowing a server to launch a virtual machine if the server is a highly trusted server (e.g., a server with a full monitoring feature turned on).

At step 406, the management server may select a server of the cloud network that may have the capability to perform the requested computing service for the user. At step 408, the management server may determine whether the selected server complies with the policy determined at step 404. For example, the management server may determine whether the selected server complies with a geographic location restriction included in the policy as described above. If the selected server does not comply with the policy, method 400 may return to step 406 where the management server may select another server. If the selected server does comply with the policy, method 400 may proceed to step 410.

At step 410, the management server may assign the selected server to perform the computing service and at step 412 may communicate the policy to the assigned server. At step 414, the management server may direct (e.g., via a network) the assigned server to generate a virtual machine image (e.g., VM image 312 of FIG. 3) for a virtual machine that may be configured to perform the requested computing service. The management server may also direct the assigned server to include the policy (e.g., policy information 317 of FIG. 3) communicated in step 412 in the virtual machine image. The assigned server may generate the virtual machine image to indicate that the assigned server has generated the virtual machine, as described above, and in further detail in FIG. 5.

At step 416, the management server may direct the assigned server to launch a virtual machine from the virtual machine image and method 400 may end. The assigned server may launch the virtual machine to indicate that the assigned server has launched the virtual machine such that the physical presence of the virtual machine may be tracked, as described above and in further detail with respect to FIG. 5.

Figure 6:
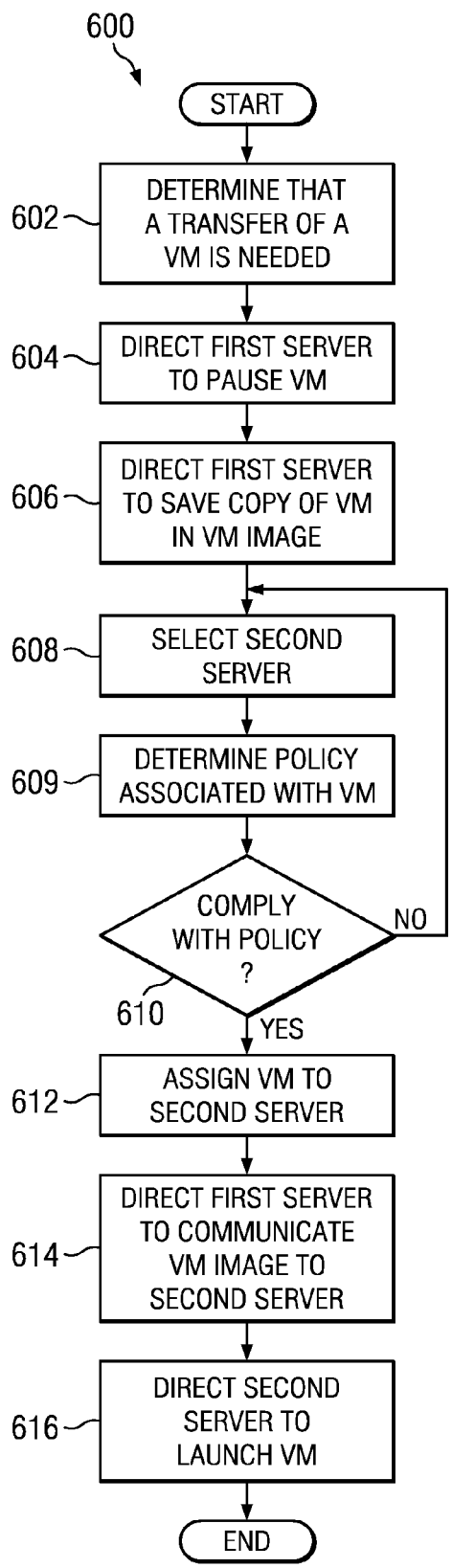
FIG. 6 illustrates an example method for enforcing a policy for a virtual machine upon transferring the virtual machine from being run by one server to being run by another server.

The management server may direct the assigned server to include the policy in the virtual machine image such that, in some embodiments, if the virtual machine associated with the virtual machine image is to be run by another server (e.g., if the assigned server needs to free up computing resources), the policy may be used to determine whether the second server complies with the policy before assigning the second server to launch and run the virtual machine, as described above with respect to FIGS. 3b and 3c and described below with respect to FIG. 6. Therefore, method 400 may be used to enforce a policy (e.g., geographic restrictions) that may be associated with running a virtual machine for a user of a cloud network.

Modifications, additions or omissions may be made to method 400 without departing from the scope of the present disclosure. In some embodiments, the order of steps of method 400 may be performed differently than described or simultaneously. For example, steps 410, 412 and 414 may be performed in a different order and/or one or more may be performed at the same time. Additionally, in the above description, a management server is described as performing the steps of method 400, however it is understood that the servers performing the computing services may perform one or more of the above described operations. Further, although method 400 is described with respect to enforcing specific policies, it is understood that method 400 may be used to enforce any suitable policy associated with a user of a cloud network and/or a virtual machine being run for the user.

Figure 5:
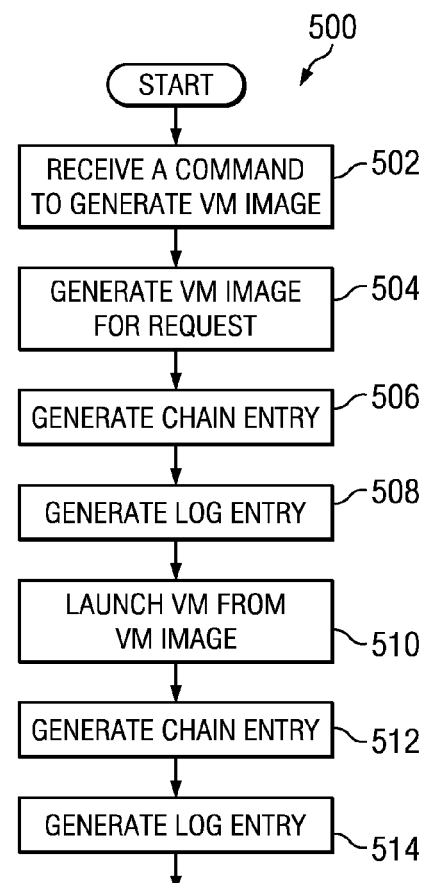
FIG. 5 illustrates an example method for tracking the physical location of a virtual machine upon generation of the virtual machine.

FIG. 5 illustrates an example method 500 for tracking the physical location of a virtual machine upon generation of the virtual machine. Method 500 may be performed by any suitable, system, apparatus or device configured to perform one or more of the steps of method 500. In the present example method 500 may be performed by a server of a cloud network (e.g., a server 200 of FIG. 2 or a server 301 of FIGS. 3a-3c); however any other suitable IT resource other than those specifically listed may perform the operations described herein.

Method 500 may start, and at step 502, a server of a cloud network may receive a command to generate a virtual machine. In some instances, the server may receive the command from a management server in response to the management server receiving a computing service request from a user of a cloud network, as described above in FIG. 4.

At step 504, the server may generate a virtual machine image for a virtual machine that may be configured to perform the requested computing service. The virtual machine image may include a physical presence chain as described above with respect to FIGS. 3a-3c.

At step 506, the server may generate a chain entry for the physical presence chain of the virtual machine image. The chain entry may include information similar to chain entry 318 of FIGS. 3a-3c and may include a digital signature of the server, a virtual machine template indicating the template used to generate the virtual machine image and a timestamp indicating the time of generation of the virtual machine image. At step 508, the server may also generate a log entry for a log server included in the cloud network as described above with respect to FIGS. 3a-3c.

At step 510, the server may launch a virtual machine from the virtual machine image generated in step 504. At step 512, the server may generate a chain entry for the physical presence chain to indicate that the server launched the virtual machine and to indicate the time that the server launched the virtual machine. The chain entry may be similar to chain entry 342 of FIGS. 3b-3c.

At step 514, the server may generate a log entry for the log server indicating that the server launched the virtual machine and to indicate the time that the server launched the virtual machine, similar to log entry 346 of FIGS. 3b-3c. Following step 514, method 500 may end. Therefore, method 500 may be used to reliably indicate that the server generated the virtual machine image and/or launched and ran the virtual machine from the virtual machine image. Accordingly, method 500 may be used such that the physical presence of the virtual machine may be verified due to the physical location of the server being obtainable as described above.

Modifications, additions, or omissions may be made to method 500 without departing from the scope of the present disclosure. For example, in some embodiments the cloud network may not include a log server such that steps 508 and 514 may be omitted. In alternative embodiments, the virtual machine image may not include the physical presence chain, such that steps 506 and 512 may be omitted. Further, in some instances the server may merely launch the virtual machine and may not generate the virtual machine image. Also, as described above with respect to FIGS. 3a-3c and 4, the server and/or the management server may be configured to determine whether the server complies with a policy associated with the virtual machine before launching the virtual machine. Additionally, in some embodiments, the server may generate the chain entries and/or log entries in response to commands received from a management server, and in other embodiments, the server may have internal programming configured to perform these operations upon generating a virtual machine image, and/or launching a virtual machine.

FIG. 6 illustrates an example method 600 for enforcing a policy (e.g., geographic restrictions, virtual machine security level policies, hypervisor policies, server security policies, etc.) for a virtual machine upon transferring the virtual machine from being run by one server to being run by another server. Method 600 may be performed by any suitable, system, apparatus or device configured to perform one or more of the steps of method 600. In the present example method 600 may be performed by a management server of a cloud network (e.g., management server 204 of FIG. 2 or management server 303 of FIGS. 3a-3c); however any other suitable IT resource other than those specifically listed may perform one or more operations described herein.

Method 600 may start, and at step 602 the management server may determine to transfer a virtual machine being run by a first server. The management server may determine to transfer the virtual machine based on a variety of factors, including, but not limited to, the first server running at or near capacity, such that a second server not running at or near capacity may be more capable of effectively running the virtual machine than the first server.

At step 604, the management server may direct (e.g., via a network) the first server to pause the virtual machine in preparation for transferring the virtual machine to the second server. The first server may accordingly pause the virtual machine. At step 606, the management server may direct the first server to save the current state of the virtual machine as a virtual machine image.

At step 608, the management server may select a second server to run the virtual machine. The management server may select the second server based on the second server being more capable (e.g., running below capacity) of effectively running the virtual machine than the first server. At step 609, the management server may determine a policy associated with the virtual machine. In some embodiments, the policy may be based on a user account for whom the virtual machine is performing computing services. In some instances, the management server may determine the policy by accessing the user's account, or may be provided by the user. In other instances, the policy may be included in the virtual machine image, and the management server may read the policy from the virtual machine image. In some instances the policy may be based on a geographic location policy.

At step 610, the management server may determine whether the second server complies with the policy. For example, the management server may determine whether the selected server complies with a geographic location restriction, is running virtual machines that comply with a security level policy, includes a hypervisor that complies with a hypervisor policy, or complies with any other policy that may be determined above. If the selected server does not comply with the policy, method 600 may return to step 608 where the management server may select another server. If the selected server does comply with the policy, method 600 may proceed to step 612.

At step 612, the management server may assign the virtual machine to the second server and at step 614, the management server may direct the first server to communicate the virtual machine image saved in step 606 to the second server. The first server may accordingly communicate the virtual machine image to the second server (e.g., via a network communicatively coupling the first and second servers). At step 616, the management server may direct (e.g., via the network) the second server to launch the virtual machine from the virtual machine image received from the first server. The second server may accordingly launch the virtual machine. Method 700 of FIG. 7 further describes operations performed by the second server upon receiving the command to launch the virtual machine from the management server. Following step 616, method 600 may end. Therefore, one or more IT resources of the cloud network may be configured to enforce a policy (e.g., a geographic location policy) associated with a user of the cloud network.

Modifications, additions or omissions may be made to method 600 without departing from the scope of the present disclosure. For example, in some embodiments, the management server may direct the transfer of the virtual machine to the second server and the second server may check the policy included in the virtual machine image to verify whether the second server complies with the policy before launching the virtual machine from the virtual machine image. In yet other embodiments, the management server may direct the transfer of the virtual machine to another server and the second server may launch the virtual machine from the virtual machine image and the virtual machine may first determine whether the second server running the virtual machine complies with the policy. If the second server does not comply with the policy, the virtual machine may terminate operations; otherwise, the virtual machine may continue operations.

Additionally, the steps of method 600 may be performed in a different order than those specifically described. For example, the management server may perform one or more of steps 608-612 before or while performing steps 604 and 606. Further, additional steps may be added and some steps may be omitted without departing from the scope of the present disclosure. Further, although method 600 is described with respect to enforcing specific policies, it is understood that method 600 may be used to enforce any suitable policy associated with a user of a cloud network and/or a virtual machine being run for the user.

Figure 7:
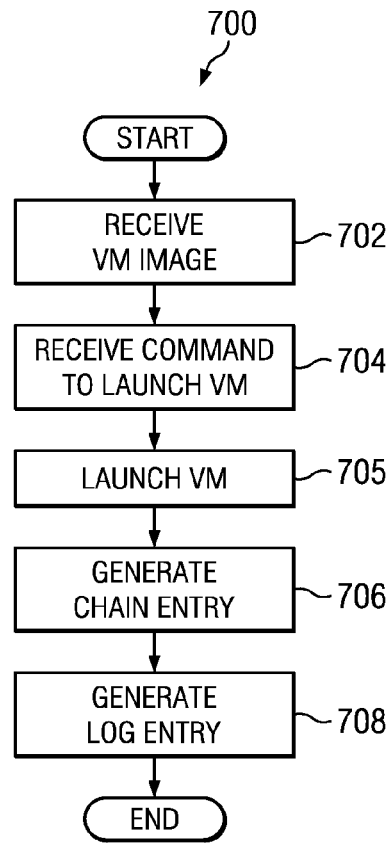
FIG. 7 illustrates an example method for tracking the physical location of a virtual machine by a server upon receiving the virtual machine from another server.

FIG. 7 illustrates an example method 700 for tracking the physical location of a virtual machine by a second server upon receiving the virtual machine from a first server. Method 700 may be performed by any suitable, system, apparatus or device configured to perform one or more of the steps of method 700. In the present example method 700 may be performed by a server of a cloud network (e.g., a server 200 of FIG. 2 or a server 301 of FIGS. 3a-3c); however any other suitable IT resource other than those specifically listed may perform the operations described herein.

Method 700 may start, and at step 702 a second server of a cloud network may receive a virtual machine image from a first server of the cloud network. The second server may receive the virtual machine image based on operations described above with respect to FIG. 6. At step 704, the second server may receive (via a network) a command to launch a virtual machine from a management server (or any other suitable IT resource) of the cloud network.

At step 705, the second server may launch a virtual machine from the virtual machine image received in step 702. At step 706, the second server may generate a chain entry for a physical presence chain included in the virtual machine image to indicate that the second server launched the virtual machine and to indicate the time that the second server launched the virtual machine. The chain entry may be similar to chain entry 352 of FIG. 3c.

At step 708, the second server may generate a log entry for the log server indicating that the second server launched the virtual machine and to indicate the time that the server launched the virtual machine, similar to log entry 354 of FIG. 3c. Following step 708, method 700 may end. Therefore, method 700 may be used to reliably indicate that the second server launched and ran the virtual machine from the virtual machine image. As described above, with respect to FIG. 5, method 500 may be used to reliably indicate another server that may have generated the virtual machine image and/or launched the virtual machine also. Accordingly, methods 500 and 700 may be used such that the physical presence of a virtual machine may be verified due to the physical location of the servers associated with the virtual machine (e.g., generating the virtual machine image and/or running the virtual machine) being obtainable as described above.

Modifications, additions, or omissions may be made to method 700 without departing from the scope of the present disclosure. For example, in some embodiments the cloud network may not include a log server such that step 708. In alternative embodiments, the virtual machine image may not include the physical presence chain, such that step 706 may be omitted. Also, as described above with respect to FIGS. 3a-3c and 6, the second server and/or the management server, may be configured to determine whether the server complies with a policy associated with the virtual machine before launching the virtual machine.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for providing evidence of a physical location of a virtual machine comprising:
launching, by an information technology (IT) resource, a virtual machine from a virtual machine image; and
generating, by the IT resource, a chain entry in a physical presence chain of the virtual machine image, the chain entry including an identifier of the IT resource indicating that the IT resource launched the virtual machine, the physical presence chain comprising a plurality of chain entries, each chain entry associated with one of a plurality of different IT resources that have launched the virtual machine.

2. The method of claim 1, further comprising generating, by the IT resource, a log entry of a log server communicatively coupled to the IT resource, the log entry including the identifier of the IT resource and a virtual machine identifier such that the log entry indicates that the IT resource launched the virtual machine.

3. The method of claim 2, further comprising generating, by the IT resource, the virtual machine image and generating, by the IT resource, a second log entry of the log server, the second log entry including the identifier of the IT resource indicating that the IT resource generated the virtual machine image.

4. The method of claim 2, further comprising comparing the log entry with the chain entry to authenticate the log entry and the chain entry.

5. The method of claim 2, wherein the log entry comprises the physical presence chain.

6. The method of claim 5, wherein the log entry further comprises a digital signature of the virtual machine to authenticate that the physical presence chain is from the virtual machine.

7. The method of claim 1, further comprising generating, by the IT resource, the virtual machine image and generating, by the IT resource, a second chain entry in the physical presence chain, the second chain entry including the identifier of the IT resource indicating that the IT resource generated the virtual machine image.

8. The method of claim 1, wherein the chain entry further includes a timestamp indicating a time that the virtual machine was launched.

9. The method of claim 1, further comprising verifying the physical presence of the virtual machine based on the identifier of the IT resource.

10. The method of claim 1, further comprising launching the virtual machine according to a computing service request of a user of a cloud network associated with the IT resource.

11. The method of claim 1, wherein the identifier is associated with a physical location indicator of the IT resource.

12. The method of claim 1, wherein the identifier of the IT resource comprises a digital signature of the IT resource to authenticate that the chain entry is from the IT resource.

13. An information technology resource comprising:
a processor;
a computer readable memory communicatively coupled to the processor; and
processing instructions encoded in the computer readable memory, the processing instructions, when executed by the processor, configured to perform operations comprising:
launching a virtual machine from a virtual machine image; and
generating a chain entry in a physical presence chain of the virtual machine image, the chain entry including an identifier of the IT resource indicating that the IT resource launched the virtual machine, the physical presence chain comprising a plurality of chain entries, each chain entry associated with one of a plurality of different IT resources that have launched the virtual machine.

14. The information technology resource of claim 13, wherein the processing instructions are further configured to perform operations comprising generating a log entry of a log server communicatively coupled to the IT resource, the log entry including the identifier of the IT resource and a virtual machine identifier such that the log entry indicates that the IT resource launched the virtual machine.

15. The information technology resource of claim 14, wherein the processing instructions are further configured to perform operations comprising generating a second log entry of the log server, the second log entry including the identifier of the IT resource indicating that the IT resource generated the virtual machine image.

16. The information technology resource of claim 14, wherein the log entry comprises the physical presence chain.

17. The information technology resource claim 16, wherein the log entry further comprises a digital signature of the virtual machine to authenticate that the physical presence chain is from the virtual machine.

18. The information technology resource of claim 13, wherein the processing instructions are further configured to perform operations comprising generating the virtual machine image and generating, by the IT resource, a second chain entry in the physical presence chain, the second chain entry including the identifier of the IT resource indicating that the IT resource generated the virtual machine image.

19. The information technology resource of claim 13, wherein the chain entry further includes a timestamp indicating a time that the virtual machine was launched.

20. The information technology resource of claim 13, wherein the processing instructions are further configured to perform operations comprising launching the virtual machine according to a computing service request of a user of a cloud network associated with the IT resource.

21. The information technology resource of claim 13, wherein the identifier is associated with a physical location indicator of the IT resource.

22. The information technology resource of claim 13, wherein the identifier of the IT resource comprises a digital signature of the IT resource to authenticate that the chain entry is from the IT resource.

* * * * *